July 5, 1927.

B. L. MALLORY 1,634,672

FAUCET

Original Filed March 2, 1923

Inventor
Bonnie L. Mallory.
By Hull, Brock & West.
Attys.

Patented July 5, 1927.

1,634,672

UNITED STATES PATENT OFFICE.

BONNIE L. MALLORY, OF CLEVELAND, OHIO.

FAUCET.

Application filed March 2, 1923, Serial No. 622,276. Renewed November 22, 1926.

This invention relates to faucets and has for its objects to provide a faucet which may be formed entirely from sheet metal and hence be inexpensive to manufacture; to provide a faucet which shall be simple in construction, easily operated, and which shall be durable in use; to provide a faucet of the aforesaid character which may be fully opened or tightly closed through a small movement of the operating handle; to provide a faucet which may be locked in the closed position and thus prevent unauthorized persons tampering therewith; while further objects and advantages will appear as the description proceeds.

Figure 1:
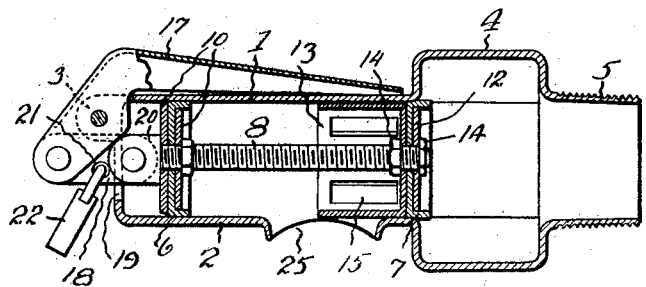
Figure 2:
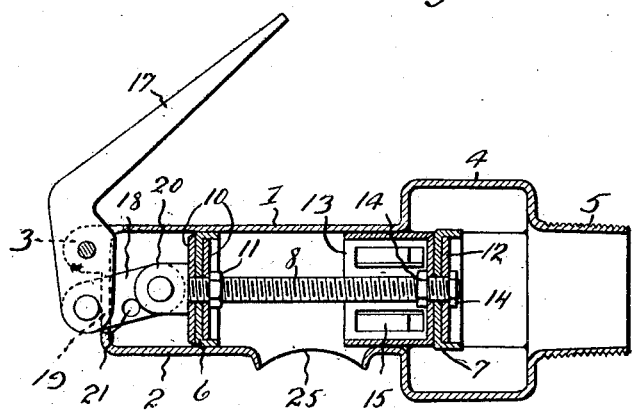
Figure 3:
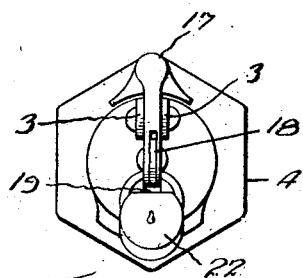

In the accompanying drawing wherein I have shown the preferred form of my invention, Fig. 1 is a longitudinal sectional view through a faucet constructed in accordance with my invention; Fig. 2 is a similar view but showing the faucet in the open position and the handle therefor in elevation; and Fig. 3 is an end elevation of the faucet.

Describing the various parts by reference characters, 1 denotes the body portion of the device which is preferably drawn from sheet metal. As shown, this body portion comprises a cylindrical neck 2 which is provided at one end with a pair of forwardly projecting ears 3 and at the opposite end said neck merges into an enlarged portion 4 which is preferably prismatic in cross section so that a wrench may be applied thereto. The wrench receiving portion 4 merges into a reduced cylindrical portion 5 which is externally threaded.

Slidably disposed within the body portion is a packing piston 6 and a valve 7 which are arranged in spaced relation and each is mounted on the end of a valve stem 8. These elements may be formed from any suitable material such as leather and are preferably cup shaped so as to form a tight seal with respect to the cylindrical neck 2. Piston 6 is clamped between a pair of disks 10 which are threaded on valve stem 8, and are retained in position by a lock nut 11. Valve 7 is clamped between a disk 12 and a cup shaped member 13, and these elements are retained in position by a pair of lock nuts 14. The side wall of member 13 serves as a guide for the valve 7 and said wall is provided with a plurality of ports 15.

The valve mechanism is operated by a lever 17 which is pivoted between ears 3 and has one end thereof bifurcated to pivotally receive a link 18. This link projects through a slot 19, formed in the end wall of neck 2, and said link is pivotally connected to a pair of ears 20 which project from one of the disks 10. Link 18 is preferably provided with an aperture 21 which is adapted to receive a lock 22 when the faucet is closed and thus prevent unauthorized persons tampering therewith.

In operation, the faucet, which is particularly adapted for use in connection with oil barrels, is threaded into the container and tightened by applying a wrench to the prismatic portion 4. The faucet is opened by raising lever 17 which permits the liquid to flow through ports 15 into the neck 2 and through a suitable discharge opening 25 formed in said neck. The piston 6 forms a tight seal with the inner wall of the neck portion and thus prevents liquid from escaping through the slot 19. When the operating lever is lowered to the position shown in Fig. 1, the valve stem and valve and piston are moved forward and valve 7 seats against the inner wall of the neck portion and thus cuts off the flow of liquid.

Having thus described my invention, what I claim is:

1. A faucet comprising a sheet metal body portion having an attaching portion and a discharge opening, a portion of said body intermediate said attaching portion and discharge opening being prismatic in cross section and adapted to receive a wrench, a valve slidably disposed within said body portion, a link connected to said valve and projecting through said body portion, a lever pivoted to the exterior of said casing and connected with said link, and means for sealing the opening through which said link projects.

2. A faucet comprising a sheet metal body portion having an attaching portion and a discharge opening, a valve slidably disposed within said body portion, a link connected to said valve and projecting through said body portion, means for sealing the opening through which said link projects, a lever pivoted to the exterior of said casing and connected to said link, and means for locking said link against movement.

3. A faucet comprising a sheet metal body portion having an attaching portion and a discharge opening, a valve and a packing piston arranged in spaced relation and slidably disposed in said body portion and movable in unison, a link connected to said valve and packing piston and projecting through said body portion, said valve controlling the flow of liquid through said discharge opening and the piston sealing the opening through which said link projects, and an operating lever connected to said link.

4. A faucet comprising a sheet metal body portion having an attaching portion and a discharge opening, a valve slidably disposed in said body portion, a portion of said body intermediate said discharge opening and attaching portion being enlarged and prismatic in cross section to form a wrench receiving portion, said valve controlling the flow of liquid from said wrench receiving portion to said discharge opening, a link connected to said valve and projecting through said body portion, means for sealing the opening in said body portion through which said link projects, and a lever operatively connected to said link.

5. A faucet comprising a sheet metal body portion having an attaching portion and a discharge opening, a valve and a piston packing arranged in spaced relation within said body portion and movable in unison, a link connected to said valve and piston and projecting through one end of said body portion, said valve controlling the flow of liquid through said discharge opening and the piston sealing the opening through which said link projects, and an operating lever pivoted to said casing and connected with said link.

In testimony whereof, I hereunto affix my signature.

BONNIE L. MALLORY.